US007271560B2

(12) United States Patent
Blatterman et al.

(10) Patent No.: US 7,271,560 B2
(45) Date of Patent: Sep. 18, 2007

(54) ASSEMBLY FOR MOVING A BARRIER AND METHOD OF CONTROLLING THE SAME

(75) Inventors: William Eugene Blatterman, Troy, OH (US); Paul Steven Mullin, Xenia, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/976,010

(22) Filed: Oct. 28, 2004

(65) Prior Publication Data

US 2006/0091838 A1 May 4, 2006

(51) Int. Cl.
*G05B 5/00* (2006.01)

(52) U.S. Cl. ...................... 318/466; 318/468; 318/266; 318/282; 318/286; 318/469; 49/26; 49/28

(58) Field of Classification Search ..................... None
See application file for complete search history.

(56) References Cited

U.S. PATENT DOCUMENTS

| | | | |
|---|---|---|---|
| 4,386,398 A | 5/1983 | Matsuoka et al. | |
| 4,498,033 A | 2/1985 | Aihara et al. | |
| 4,847,541 A | 7/1989 | Krieger | |
| 5,197,582 A | 3/1993 | Cropley | |
| 5,557,887 A | 9/1996 | Fellows et al. | |
| 5,770,934 A | 6/1998 | Theile | |
| 6,184,641 B1 | 2/2001 | Crimmins et al. | |
| 6,278,249 B1 | 8/2001 | Fitzgibbon et al. | |
| 6,326,754 B1 | 12/2001 | Mullet et al. | |
| 6,624,605 B1 | 9/2003 | Powder et al. | |
| 6,667,591 B2 | 12/2003 | Mullet et al. | |
| 6,774,594 B2 | 8/2004 | Fitzgibbon et al. | |
| 6,777,902 B2 * | 8/2004 | Fitzgibbon et al. | 318/466 |
| 2003/0076062 A1 | 4/2003 | Mullet et al. | |
| 2003/0178957 A1 | 9/2003 | Fitzgibbon et al. | |
| 2003/0178962 A1 | 9/2003 | Fitzgibbon et al. | |
| 2003/0205980 A1 | 11/2003 | Fitzgibbon et al. | |

* cited by examiner

*Primary Examiner*—Lincoln Donovan
*Assistant Examiner*—Eduardo Colon
(74) *Attorney, Agent, or Firm*—Michael Best & Friedrich LLP

(57) ABSTRACT

An assembly for moving a barrier from one of a closed position and an opened position to the other of the closed position and the opened position. The assembly includes a motor to supply one of a first power and a second power to the barrier. The assembly also includes a controller to control the motor to supply the first power to move the barrier towards the closed position from the opened position. The controller also controls the motor to supply the first power to the barrier to move towards the opened position from the closed position, and to supply the second power intermittently after the barrier has started moving towards the opened position and before arriving at the opened position.

30 Claims, 4 Drawing Sheets

ASSEMBLY FOR MOVING A BARRIER AND METHOD OF CONTROLLING THE SAME

BACKGROUND

The present invention relates to barriers, and more particularly to a control system for a barrier such as a garage door.

A typical barrier, such as a garage door, can be can be lowered to a closed position and lifted to an opened position by a motor during a closing cycle and an opening cycle, respectively. During the closing cycle, the motor generally lowers the barrier with a first predetermined amount of power. During the opening cycle, the motor generally lifts the barrier with the same first predetermined amount of power. For example, the first predetermined amount of power can be ½ horsepower ("hp").

When the barrier is heavy, the motor is typically configured differently to overcome a different moment of inertia. That is, the motor is configured to lift the barrier with a second predetermined amount of power that is typically greater than the first predetermined amount of power. In such cases, the second predetermined amount of power can be ¾ hp. However, starting and lifting the barrier at high power such as ¾ hp can lead to excessive mechanical shock to the barrier. As a result of the excessive mechanical shock to the barrier, the barrier and its mounting hardware can be damaged over time.

SUMMARY

Accordingly, there is a need for improved motor control to minimize damage caused to the barrier and its mounting hardware, and to provide enough power to lift a heavier barrier.

In one form, the invention provides an assembly for moving a barrier from one of a closed position and an opened position to the other of the closed position and the opened position. The assembly includes a motor connectable to the barrier and configured to supply one of a first power and a second power to the barrier. The assembly also includes a controller that controls the motor to supply the first power to move the barrier towards the closed position from the opened position. The controller also controls the motor to supply the first power to the barrier to move towards the opened position from the closed position, and to supply the second power intermittently after the barrier has started moving towards the opened position and before arriving at the opened position.

In another form, the invention provides a method of moving a barrier with a motor. The method includes supplying a first power from the motor to the barrier when the barrier starts to move from an opened position towards a closed position. The method also includes supplying the first power from the motor to the barrier when the barrier starts to move from the closed position towards an opened position. Thereafter, the method includes intermittently supplying a second power after the barrier has started moving towards the opened position and before arriving at the opened position.

In another form, the invention provides a method of moving a barrier with a motor having a first set of windings and a second set of windings. The method includes supplying power to the first set of windings to move the barrier from an opened position towards a closed position with a first motor power. The method also includes supplying power to the second set of windings to start moving the barrier from the closed position towards the opened position with the first motor power. The method also includes supplying power to the first set of windings to move the barrier towards the opened position after the barrier has started to move from the closed position towards the opened position and before arriving at the opened position with a second motor power. The method also includes supplying power to the second set of windings to continue moving the barrier from the closed position towards the opened position with the first motor power and after the motor has moved the barrier from the closed position towards the opened position with the second motor power.

In another form, the invention provides an assembly for moving a barrier from one of a closed position and an opened position to the other of the closed position and the opened position. The assembly includes a motor that has a first set of windings and a second set of windings. The motor is also capable of moving the barrier at a first power when the first set of windings is powered and a second power when the second set of windings is powered. The assembly also includes a controller that is configured to power the first set of windings when the barrier starts to move from the opened position towards the closed position. The controller is also configured to power the second set of windings when the barrier starts to move from the closed position towards the opened position, and to power the first set of windings intermittently after the barrier has started moving from the closed position towards the opened position and before arriving at the opened position.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "supported," and "mounted" and variations thereof herein are used broadly and encompass direct and indirect connections, couplings, supports, and mountings. In addition, the terms "connected" and "coupled" and variations thereof are not restricted to physical or mechanical connections or couplings.

DETAILED DESCRIPTION

Figure 1:
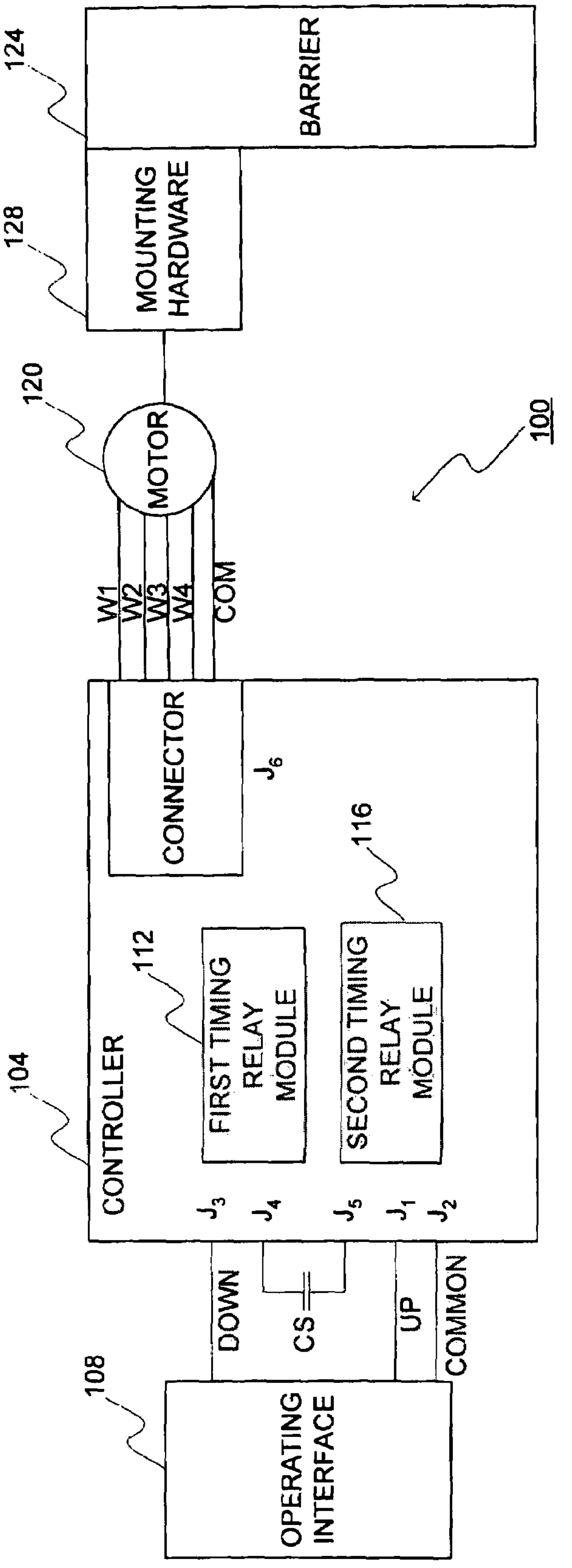
FIG. 1 shows a block diagram of a barrier movement system.

FIG. 1 shows a block diagram of a barrier movement system 100 such as a garage door system. The barrier movement system 100 includes a controller 104 that receives a barrier movement signal from an operating interface 108 such as a switch. The controller 104 includes a first timing relay module 112 that controls a first one or more relays, and a second timing module 116 that controls the timings of a second one or more relays. Upon receiving the barrier movement signal from the operating interface 108 via a plurality of connectors J1, J2, J3, the controller 104 activates a motor 120 through the relays and a plurality of winding connections W1, W2, W3, W4. Once activated, the motor 120 can move a barrier 124 from one position to another position. For example, the barrier 124 can be moved from an opened position to a closed position in a closing cycle. The barrier 124 can be moved from the closed position to the opened position in an opening cycle. The motor 120 shown in FIG. 1 can be a permanent split capacitor ("PSC") motor with multiple windings, although other types of motors can also be used. The motor 120 is generally wired such that there are variations in power delivered by the motor 120. For example, the motor windings can be wired such that a first set of windings (powered by connections W1, W3) delivers a first power and a second set of windings (powered by connections W2, W4) delivers a second power. In some constructions, the first power is ½ horsepower ("hp"), and the second power is ¾ hp. In such cases, the motor 120 can deliver ½ hp moving the barrier 124 up and down, and ¾ hp moving the barrier 124 up and down depending on how the windings are connected.

Figure 5:
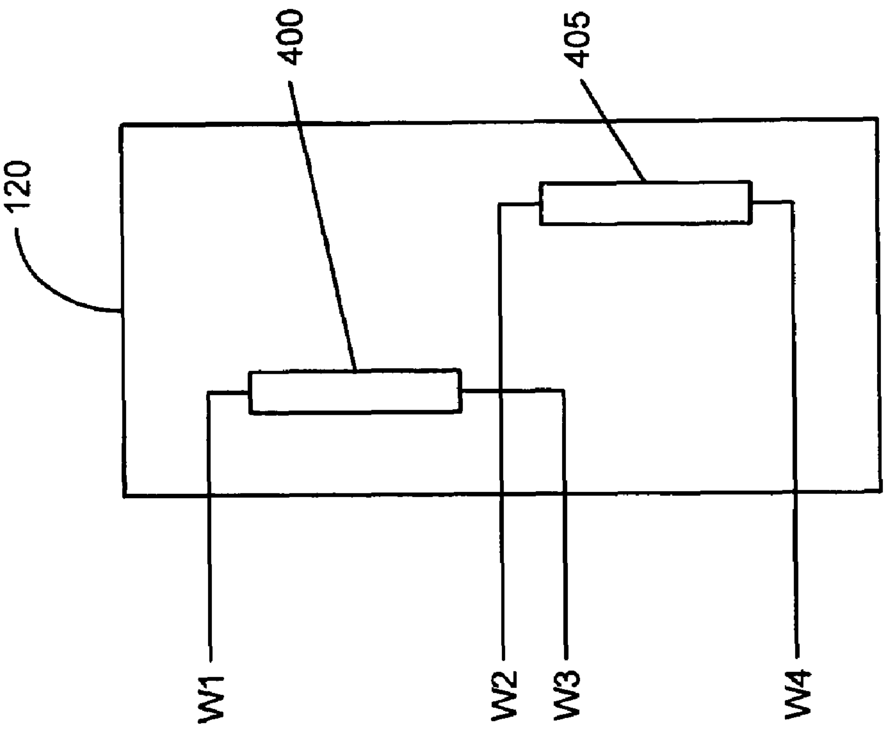
FIG. 5 shows a block diagram of a portion of a second exemplary motor with first and second set of windings.
Figure 4:
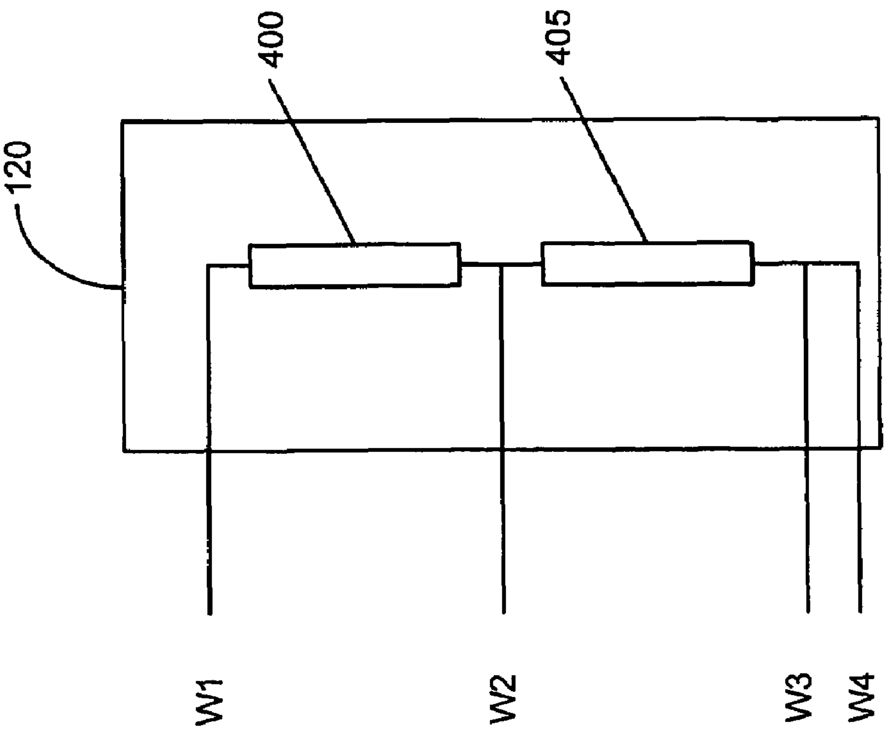
FIG. 4 shows a block diagram of a portion of an exemplary motor with first and second set of windings.

FIGS. 4 and 5 show two exemplary constructions of motor 120 wired such that motor 120 includes a first set of windings, or winding arrangement, 400 and a second set of windings, or winding arrangement, 405. Other constructions of motor 120 can include different configurations operable to form a first set of windings and a second set of windings.

Figure 2:
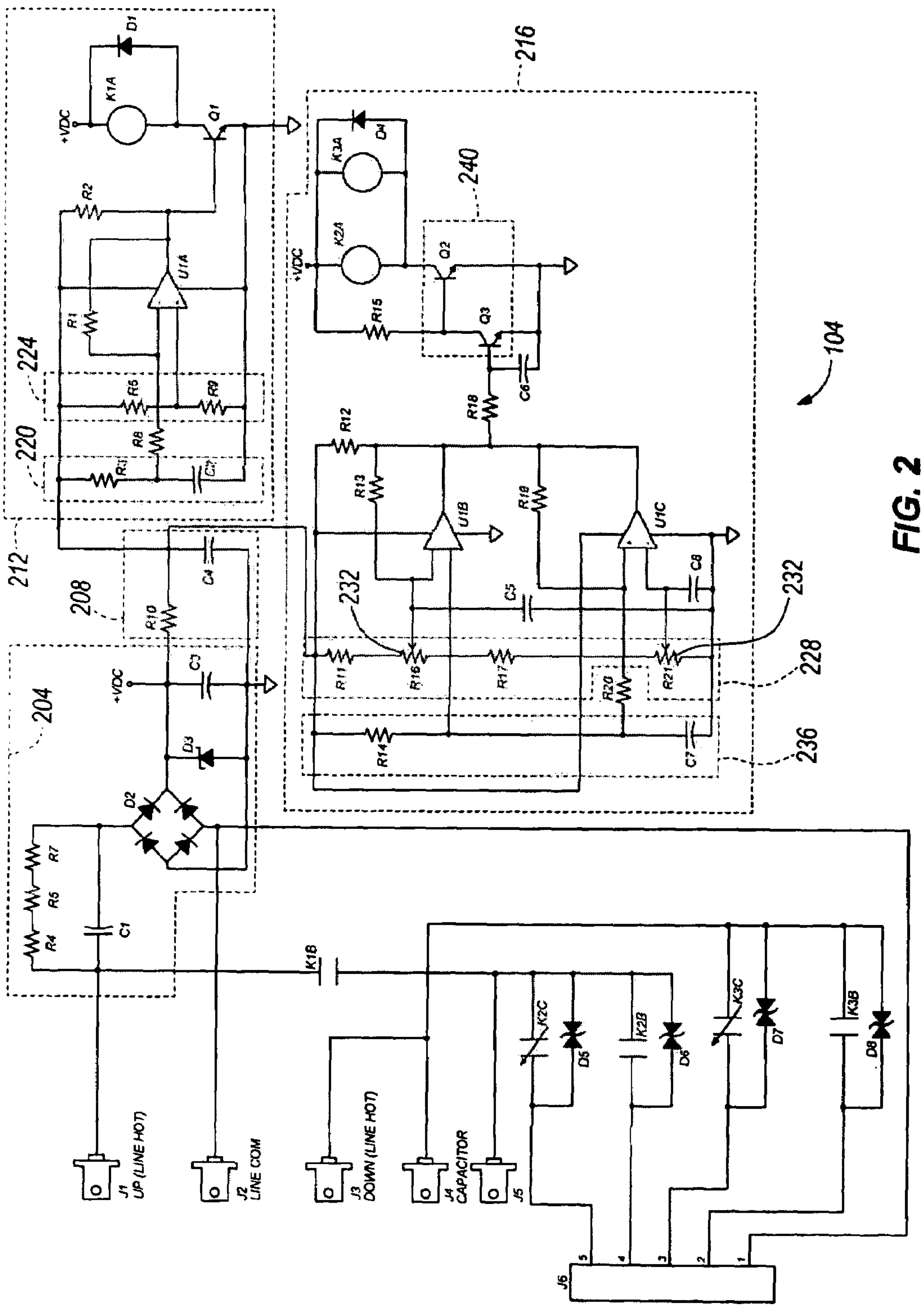
FIG. 2 shows a circuit diagram of one construction of the controller of FIG. 1.

FIG. 2 shows a circuit diagram of one construction of the controller 104 of FIG. 1. The controller 104 has a series of inputs including an up connector J1, a common connector J2, a down connector J3, and two capacitor connectors J4, J5. The controller 104 receives the barrier movement signal from the operating interface 108 through connectors J1, J2, J3. In some constructions, the voltage applied across the up connector J1 and the common connector J2 is 115 VAC, and the voltage applied across the down connector J3 and the common connector J2 is also 115 VAC. However, other voltages can also be applied across the connectors J1, J2 and the connectors J2, J3.

The controller also includes a motor connector J6 that connects the first and second sets of windings of the motor 120 to the controller 104. When a down power signal is generated at the operating interface 108, and received at the down connector J3, a motor start capacitor CS connected across the two capacitor connectors J4, J5 is configured to provide a phase shift from a line frequency for use in a winding of the motor 120, and relay contacts K2C, K3C remain closed. The down power signal is typically 115 VAC. The motor 120 thus starts to generate a first power, such as ½ hp, to lower the barrier. 124.

During the opening cycle, the controller 104 controls all three relays K1, K2, K3 in such a way that the motor 120 starts in a first power for a first determined amount of time. The motor 120 then intermittently switches to a second power for a second determined amount of time, and returns back to the first power for the remaining of the opening cycle. In some constructions, the motor 120 intermittently switches from the first power to the second power such that the motor 120 runs at the second power for a predetermined amount of time. In some other constructions, the motor 120 intermittently switches from the first power to the second power such that the motor 120 runs at the second power for more than one predetermined amount of time.

To run the barrier 124 in an up direction, the operating interface 108 generates an up power signal or an up signal. The up signal is subsequently received at the up connector J1. The controller 104 then processes the up signal, which is typically 115 VAC. For example, the controller 104 processes the up signal by switching a plurality of relays on and off which open and close a plurality of relay contacts, respectively. Thereafter, the controller 104 supplies power to some combinations of the windings to run the motor 120 at different power levels. The power generated by the motor 120 is then used to move the barrier 124 and its associated mounting hardware 128. In this way, the motor 120 supplies or provides different power to the barrier 124 such that the barrier 124 can be moved in a variety of ways by the motor 120. In some constructions where the motor 120 is a PSC motor, when the winding connections W1, W3 are powered, the motor 120 can be run at ¾ hp in the up direction or ½ hp in the down direction depending on the direction of current supplied to the motor 120. In these same constructions, when the winding connections W2, W4 are powered, the motor 120 can be run at ½ hp in the up direction or ¾ hp in the down direction depending on the direction of current supplied to the motor 120.

Specifically, the controller 104 also includes a power supply section 204 that includes a plurality of resistors R4, R5, R7; capacitors C1, C3; a bridge-style rectifier D2; and a high-power diode D3. The power supply section 204 generates from the up power signal a direct-current ("DC") output voltage signal that is further filtered by a first resistor-capacitor ("RC") combination 208 with resistor RIO and capacitor C4. In some constructions, the DC output voltage is 24 VDC. Of course, the controller 104 can also be configured to provide other output voltages.

The filtered DC output voltage signal is fed to a plurality of operating sections such as a first timing relay section 212 and a second timing relay section 216. The first timing relay section 212 includes a second RC combination 220 with a resistor R3 and a capacitor C2 that controls a time delay signal for powering the motor 120. The time delay signal generated by the second RC combination 220 is fed to one of the inputs to a comparator U1A. The first timing relay section 212 also includes a first voltage divider 224 (with resistors R6, R9) that divides the DC output voltage signal. The divided DC output voltage signal is then fed to the other input of the comparator U1A. In this way, the comparator U1A changes its output after a predetermined time constant, which is controlled by the second RC combination 220. The comparator U1A generates a high output or a low output based on the voltage at the inputs. The output of the comparator U1A is fed to the base of a first transistor Q1 that is further coupled to a relay K1 having a relay coil K1A and a relay contact K1B.

In some constructions, the relay K1 is initially not energized, and the output of the comparator U1A is at low. That is, the relay K1, which is normally opened, remains opened. The capacitor C2 of the second RC combination 220 is charged through a resistor R3. Once charged, the comparator U1A generates a high output. The high comparator U1A output turns on the transistor Q1 that in turn energizes the relay coil K1A. The energized relay coil K1A then closes a relay contact K1B. Once the relay contact K1B is closed, the up signal is provided to the motor connector J6.

Specifically, the second timing relay section 216 receives the filtered DC output voltage signal from the power supply section 204. The filtered DC output voltage signal is divided by a second voltage divider 228 whose divided outputs are fed to a plurality of comparators U1B, U1C. The second voltage divider 228 includes a plurality of potentiometers 232 that can be adjusted for different barriers or systems. In other constructions, the potentiometers 232 can be replaced by fixed resistors. The second timing relay section 216 also includes a third RC combination 236 (with a resistor R14, and a capacitor C7) that controls a second time delay signal for the comparators U1B, U1C. The capacitor C7 typically has a value that is greater than that of the capacitor C2. In this way, the second time delay signal introduced by the third RC combination 236 and the second voltage divider 228 is typically shorter than the first time delay signal introduced by the second RC combination 220 allowing a plurality of relay contacts K2B, K2C, K3B, K3C to settle.

Each of the comparators U1B, U1C has an output. The outputs from the comparators U1B, U1C are coupled to the base of a transistor Q3 of a transistor pair 240 consisting of transistors Q2, Q3. The transistor pair 240 is coupled to a pair of relays K2, K3. The relay K2 includes a relay coil K2A, a relay contact K2B that is normally opened, and a relay contact K2C that is normally closed. The relay K3 includes a relay coil K3A, a relay contact K3B that is normally opened, and a relay contact K3C that is normally closed.

Initially, the output of the comparator U1C is at low, and the output of the comparator U1B is at high, which turns off the transistor Q3, and turns on the transistor Q2. The relay coils K2A, K3A are energized, and in turn, the relay contacts K2B, K3B are closed. In this way, the up signal is provided to the motor 120 through the relay contacts K2B, K3B. The motor 120 can thus start generating a first power, such as ½ hp, in an up direction for a predetermined amount of time controlled by the third RC combination 236.

Once the capacitor C7 has been charged to a voltage greater than the voltage set by the resistor R21 but yet less than the voltage set by the resistor R16, both outputs of the comparators U1B, U1C turn high, the transistor Q3 turns on, and the transistor Q2 turns off. In this way, the relay coils K2A, K3A are de-energized, and the relay contacts K2C, K3C return to their normally closed positions. The up signal is thus provided to the motor 120 through the relay contacts K2C, K3C, thereby allowing the motor 120 to generate a second power, such as ¾ hp, in the up direction for a second predetermined amount of time controlled by the third RC combination 236.

After the capacitor C7 has been charged to a voltage above the voltage set by the resistor R16, the outputs of the comparators U1B, U1C change and lead to another level of power being applied to the motor 120. Specifically, the output of the comparator U1B goes to low, which turns off the transistor Q3 and turns on the transistor Q2. In this way, the relay contacts K2B and K3B return to the normally open position, and the relay contacts K2C, K3C allow the motor 120 to generate the first power again. In this way, the controller 104 starts the motor 120 soft in the first power, and switches to the higher second power intermittently to ensure the barrier 124 starts to move. The motor 120 can then be run at the first power for the remainder of the opening cycle.

Figure 3:
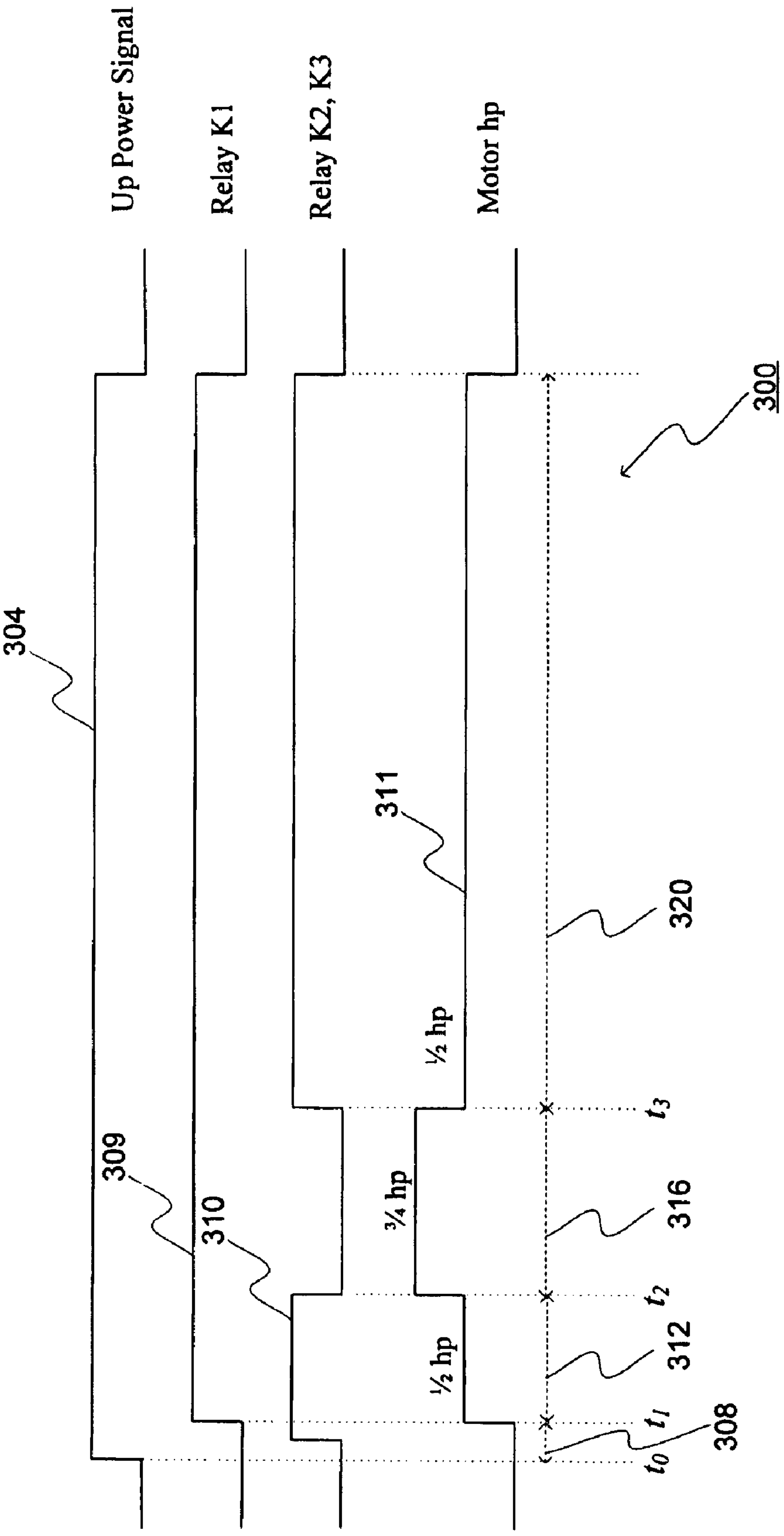
FIG. 3 shows an exemplary timing diagram illustrating the power generated by the motor of the system of FIG. 1 during an opening cycle.

FIG. 3 shows an exemplary timing diagram 300 illustrating the power generated by the motor 120 of the system 100 of FIG. 1 during an opening cycle. During the opening cycle, an up signal 304 is applied to the up connector J1 at time $t_0$ to cause the motor 120 to drive the barrier 124 towards the opened position. As described earlier, the relay contact K1B remains opened to prevent the motor 120 from starting when the up signal or the up power is initially applied. Meanwhile, the power supply section 216 is powered by the up signal through the up connector J1, and the controller 104 begins a timed sequence of relay closures to control the power generated by the motor 120.

As illustrated in FIG. 3, during a first period between $t_0$ and $t_1$ 308, the up signal 304, typically 115 VAC, is not applied to the motor 120. In this way, the controller 104 allows the relay coils K2A and K3A to be energized during the first period 308 which is controlled by the second RC combination 220. An exemplary first period 308 is less than 100 ms. The first period 308 allows the relay contacts K2B, K3B to settle after the relay coils K2A, K3A have been energized. At $t_1$, the relay contacts K1B, K2B, K3B are closed (illustrated by signals 309 and 310, respectively), thereby starting the motor 120 (represented by signal 311) in the first power, such as ½ hp, for a first predetermined amount of time 312. The first predetermined amount of time 312 can range from 0.25 seconds to more than 4 seconds.

After the first predetermined amount of time 312 at $t_2$, the relay coils K2A, K3A are de-energized, and the relay contacts K2C, K3C are closed. Once the relay contacts K2C, K3C are closed, the controller 104 runs the motor 120 in the second power, such as ¾ hp, for a second predetermined amount of time or period 316 intermittently. The second predetermined amount of time 316 can range from 0.25 second to more than 4 seconds. In some constructions, the motor 120 generates the second power intermittently for more than one period of time. In some other constructions, the motor 120 generates the second power intermittently for only one period of time. Thereafter at $t_3$, the relay coils K2A, K3A are again energized, thereby closing the relay contacts K2B, K3B. In this way, the controller 104 again runs the motor 120 in the first power for the remaining of the opening cycle 320.

Various features and advantages of the invention are set forth in the following claims.

The invention claimed is:

1. An assembly for moving a barrier from one of a closed position and an opened position to the other of the closed position and the opened position, the assembly comprising:

a motor connectable to the barrier and configured to supply one of a first power and a second power, greater than the first power, to the barrier; and a controller configured to determine a first time period and a second time period, to control the motor to supply the first power to move the barrier towards the closed position from the opened position, to supply the first power for the first determined time period to move the barrier towards the opened position from the closed position, to supply the second power intermittently for the second determined time period after the barrier has started moving towards the opened position and before arriving at the opened position, and to return to supply the first power to continue moving the barrier towards the opened position.

2. The assembly of claim 1, wherein the controller comprises a relay configured to generate a time delay before the barrier starts to move towards the opened position from the closed position.

3. The assembly of claim 1, wherein the controller further comprises a second one or more relays to configure the motor to supply the first power to move the barrier towards the opened position from the closed position, and to configure the motor to supply the second power intermittently to move the barrier after the barrier has started moving towards the opened position and before arriving at the opened position.

4. The assembly of claim 3, wherein the second relay is further configured to control the motor to supply the first power to move the barrier after the controller has supplied the second power intermittently to the barrier.

5. The assembly of claim 1, wherein the controller further comprises a power supply configured to receive a power signal, and to convert the power signal into the first and second power.

6. The assembly of claim 1, wherein the first determined time period is adjustable.

7. The assembly of claim 1, wherein the second determined time period is adjustable.

8. The assembly of claim 1, wherein the motor comprises a permanent split capacitor motor.

9. A method of moving a barrier with a motor, the method comprising:

determining a first time period and a second time period;

supplying a first power from the motor to the barrier when the barrier starts to move from an opened position towards a closed position;

supplying the first power from the motor to the barrier for the first determined time period when the barrier starts to move from the closed position towards an opened position;

intermittently supplying a second power that is greater than the first power from the motor to the barrier for the second determined time period after the barrier has started moving towards the opened position and before arriving at the opened position; and re-supplying the first power from the motor to the barrier after the intermittently supplying the second power.

10. The method of claim 9, wherein supplying the first power further comprises adjusting the first determined time period.

11. The method of claim 9, wherein supplying the second power for at least one period of time comprises adjusting the second determined time period.

12. The method of claim 9, further comprising generating a time delay before the barrier starts to move towards the opened position.

13. The method of claim 9, wherein the motor comprises a permanent split capacitor motor.

14. A method of moving a barrier with a permanent split capacitor motor having a first set of windings and a second set of windings, the method comprising:

supplying power with a first current direction to the first set of windings to move the barrier from an opened position towards a closed position with a first motor power;

supplying power to the second set of windings to start moving the barrier from the closed position towards the opened position with the first motor power, the second set of windings being different from the first set of windings;

supplying power with a second current direction to the first set of windings to move the barrier towards the opened position after the barrier has started to move from the closed position towards the opened position and before arriving at the opened position with a second motor power, the second motor power being greater than the first motor power and the second current direction being different than the first current direction; and supplying power to the second set of windings to continue moving the barrier from the closed position towards the opened position with the first motor power and after the motor has moved the barrier from the closed position towards the opened position with the second motor power.

15. The method of claim 14, further comprising generating a time delay before the barrier starts to move from the closed position towards the opened position.

16. The method of claim 14, further comprising:

activating a first relay to couple power to the second set of windings to start moving the barrier from the closed position towards the opened position with the first motor power, and to couple power to the second set of windings to continue moving the barrier from the closed position towards the opened position with the first motor power and after the motor has moved the barrier from the closed position towards the opened position with the second motor power; and activating a second relay to couple power to the first set of windings to move the barrier towards the opened position after the barrier has started to move from the closed position towards the opened position and before arriving at the opened position with a second motor power.

17. The method of claim 14, further comprising rectifying a source power into the power.

18. The method of claim 14, further comprising supplying power to the first set of windings to move the barrier towards the opened position after the barrier has started to move from the closed position towards the opened position and before arriving at the opened position with a second motor power for at least one period of time.

19. An assembly for moving a barrier from one of a closed position and an opened position to the other of the closed position and the opened position, the assembly comprising:

a permanent split capacitor motor having a first set of windings and a second set of windings, the second set of windings being different from the first set of windings; and a controller configured to power with a first current direction the first set of windings to result in the motor starting to move the barrier from the opened position towards the closed position, to power the second set of windings to result in the motor starting to move the barrier with a first motor power from the closed position towards the opened position, and to power with a second current direction the first set of windings intermittently after the barrier has started moving from the closed position towards the opened position and before arriving at the opened position to result in the motor moving the barrier with a second motor power, the second motor power being greater than the first motor power and the second current direction being different than the first current direction.

20. The assembly of claim 19, further comprising a relay configured to generate a time delay before the barrier starts to move from the closed position towards the opened position.

21. The assembly of claim 19, further comprising a rectifier configured to transform a source power into the power.

22. The assembly of claim 19, further comprising a relay configured to couple power to the first set of windings to move the barrier towards the opened position after the barrier has started to move from the closed position towards the opened position and before arriving at the opened position with the second motor power for at least one period of time.

23. An assembly for moving a barrier from one of a closed position and an opened position to the other of the closed position and the opened position, the assembly comprising:

a motor having at least one winding selectable as a first winding arrangement and a second winding arrangement, the second winding arrangement being different from the first winding arrangement; and a controller configured to power the first winding arrangement to start to move the barrier towards the opened position from the closed position, intermittently power the second winding arrangement to continue to move the barrier towards the opened position after the barrier has started to move towards the opened position and before arriving at the opened position, and power the first winding arrangement to continue to move the barrier towards the opened position after the controller provides the intermittent power.

24. The assembly of claim 23, wherein the controller is further configured to power the second winding arrangement to move the barrier towards the closed position from the opened position.

25. The assembly of claim 23, wherein the motor comprises a permanent split capacitor motor.

26. The assembly of claim 25, wherein the controller is further configured to determine a first time period and a second time period, wherein the controller powers the first winding arrangement to start to move the barrier for the first determined time period, and wherein the controller intermittently powers the second winding arrangement for the second determined time period.

27. A method of moving a barrier with a motor having at least one winding selectable as a first winding arrangement and a second winding arrangement, the method comprising:

energizing a first winding arrangement to start moving the barrier from a closed position towards an opened position;

intermittently energizing a second winding arrangement to continue to move the barrier towards the opened position after the barrier has started to move from the closed position and before arriving at the opened position, the second winding arrangement being different from the first winding arrangement; and reenergizing the first winding arrangement to continue to move the barrier towards the opened position after intermittently energizing the second winding arrangement.

28. The method of claim 27, further comprising energizing the second winding arrangement to move the barrier from the opened position towards the closed position.

29. The method of claim 27, wherein the motor comprises a permanent split capacitor motor.

30. The method of claim 27, and further comprising determining a first time period and a second time period, wherein the energizing a first winding arrangement occurs for the first determined time period, and wherein intermittently energizing the second winding arrangement occurs for the second determined time period.

* * * * *